United States Patent
Paddon et al.

(10) Patent No.: US 11,729,477 B2
(45) Date of Patent: Aug. 15, 2023

(54) PERSONALIZATION OF USER GENERATED CONTENT

(71) Applicant: Sony Interactive Entertainment Inc., Tokyo (JP)

(72) Inventors: Stephen Paddon, San Mateo, CA (US); Mischa Stephens, San Mateo, CA (US); Ramana Prakash, San Mateo, CA (US); Xiaohan Zhang, San Mateo, CA (US); Andrew Herman, San Mateo, CA (US); Adil Sherwani, San Mateo, CA (US); Dustin Clingman, San Mateo, CA (US); Dmitry Makarov, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 2 days.

(21) Appl. No.: 17/516,936

(22) Filed: Nov. 2, 2021

(65) Prior Publication Data
US 2023/0132529 A1    May 4, 2023

(51) Int. Cl.
| | |
|---|---|
| *H04N 21/845* | (2011.01) |
| *H04N 21/84* | (2011.01) |
| *H04N 21/454* | (2011.01) |
| *A63F 13/798* | (2014.01) |
| *A63F 13/86* | (2014.01) |
| *A63F 13/533* | (2014.01) |

(52) U.S. Cl.
CPC ....... *H04N 21/8455* (2013.01); *A63F 13/533* (2014.09); *A63F 13/798* (2014.09); *A63F 13/86* (2014.09); *H04N 21/4542* (2013.01); *H04N 21/84* (2013.01)

(58) Field of Classification Search
CPC ............ H04N 21/8455; H04N 21/4542; A63F 13/533; A63F 13/798; A63F 13/86
See application file for complete search history.

(56) References Cited

U.S. PATENT DOCUMENTS

| | | |
|---|---|---|
| 2008/0207137 A1 | 8/2008 | Maharajh et al. |
| 2010/0041475 A1 | 2/2010 | Zalewski et al. |
| 2013/0064527 A1 | 3/2013 | Maharajh et al. |
| 2014/0317112 A1 | 10/2014 | Maharajh et al. |

(Continued)

OTHER PUBLICATIONS

PCT Application No. PCT/US2022/043953 International Search Report and Written Opinion dated Jan. 4, 2023.

*Primary Examiner* — Reginald A Renwick
(74) *Attorney, Agent, or Firm* — Polsinelli LLP

(57) ABSTRACT

A system and method for providing personalized assistance in a virtual environment is disclosed. A plurality of trigger events is stored in memory, each trigger event based on a user interaction in the virtual environment. Data sent over a communication network regarding gameplay of a user associated with a media title engaged in the virtual environment is received. Play characteristics exhibited by the user based on the received data are identified. One or more user generated content streams that meet conditions of an identified one or more trigger events are identified. Identified streams are ranked based on a match between the play characteristics exhibited by the user and metadata of each of the identified streams. A display of the ranked streams is provided, wherein the display includes an analysis of the match.

17 Claims, 7 Drawing Sheets

(56) References Cited

U.S. PATENT DOCUMENTS

| | | |
|---|---|---|
| 2019/0201786 A1 | 7/2019 | Mueller |
| 2019/0262724 A1* | 8/2019 | Trombetta .............. A63F 13/86 |
| 2022/0062772 A1* | 3/2022 | Holmdahl ............... A63F 13/77 |

* cited by examiner

PERSONALIZATION OF USER GENERATED CONTENT

BACKGROUND

Field of the Invention

The present system generally relates to providing user generated content to a user. More specifically, the present system relates to providing recommendations for personalized user generated content to a user of an entertainment device.

Description of the Related Art

Digital media content in the modern era is available in a wide variety of formats and is accessed through various services and platforms. Traditional digital media content formats, such as television shows, feature films, and video games are presently available alongside user generated content from platforms like YouTube and Twitch.tv. Improvements in high-speed internet technology, computing systems, and entertainment devices, coupled with increased availability of the same, has provided users with unprecedented access to creating content and consuming content created by other users. While increased diversity and availability of content provides additional options for the consumer of the content, providing filtering and curation of content based on the preferences and needs of a user has become increasingly challenging.

User generated content ("UGC"), such as prerecorded videos or livestreams of gameplay or tutorials related to a video game may be uploaded by users or video game developers to user generated content platforms. The user generated content can be located by players of a game when browsing categories or performing a search on such platforms. Categories of content and search queries for content may be organized and displayed based on metadata of the content, such as title, description, or tags.

A player may wish to browse or search for videos and livestreams on a user generated content platform for a variety of reasons, such as to improve skills associated with a game by watching the play of another user, or to find additional playable content related to the games and genres that the player enjoys. Current platforms present user generated content to a player in a structure that is limited by information available about the player and content the player wishes to locate. The platform may utilize a history of content the player has previously watched on the platform or text input by the player in a search query to sort and display content to the player. However, such methods of locating content lack direct information from recent gameplay of the player, the style of play the player engages in, or the skill level of the player. As such, searches do not provide personalized content catered to the preferred style of play of the player. Thus, the player may have to sort, watch, or browse through many content results before finding content that fits the playstyle of the player.

Therefore, there is a need in the art for providing improved personalization of presenting user generated content.

SUMMARY

Embodiments of the present invention include methods for providing personalized assistance in a virtual environment. A plurality of trigger events may be stored in memory, each trigger event based on a user interaction in the virtual environment. Data sent over a communication network regarding gameplay of a user associated with a media title engaged in the virtual environment may be received. Play characteristics exhibited by the user based on the received data may be identified. One or more user generated content streams that meet conditions of an identified one or more trigger events may be identified. Identified streams may be ranked based on a match between the play characteristics exhibited by the user and metadata of each of the identified streams. A display of the ranked streams may be provided, wherein the display includes an analysis of the match.

Embodiments of the present invention include systems for providing personalized assistance in a virtual environment. The system includes a memory that may store a plurality of trigger events, each trigger event based on a user interaction in the virtual environment. The system also includes a communication interface that may receive data sent over a communication network regarding gameplay of a user associated with a media title engaged in the virtual environment. The system also includes a processor that executes instructions stored in memory that may identify play characteristics exhibited by the user based on the received data, identify one or more user generated content streams that meet conditions of an identified one of the trigger events, rank the identified streams based on a match between the play characteristics exhibited by the user and metadata of each of the identified streams, and provide a display of the ranked streams, wherein the display includes an analysis of the match.

Embodiments of the present invention also include a non-transitory computer-readable storage medium having embodied thereon a program, the program being executable by a processor to perform a method for providing personalized assistance in a virtual environment. The method may include a plurality of trigger events stored in memory, each trigger event based on a user interaction in the virtual environment. The method may also include receiving data sent over a communication network regarding gameplay of a user associated with a media title engaged in the virtual environment. The method may also include identifying play characteristics exhibited by the user based on the received data. The method may also include identifying one or more user generated content streams that meet conditions of an identified one or more trigger events. The method may also include ranking the identified streams based on a match between the play characteristics exhibited by the user and metadata of each of the identified streams. The method may also include providing a display of the ranked streams, wherein the display includes an analysis of the match.

DETAILED DESCRIPTION

The detailed description set forth below is intended as a description of various configurations of the subject technology and is not intended to represent the only configurations in which the technology may be practiced. The appended drawings are incorporated herein and constitute a part of the detailed description. The detailed description includes specific details for the purpose of providing a more thorough understanding of the technology. However, it will be clear and apparent that the technology is not limited to specific details set forth herein and may be practiced without these details. In some instances, structures and components are shown in block diagram form to avoid obscuring the concepts of the subject technology.

Figure 1:
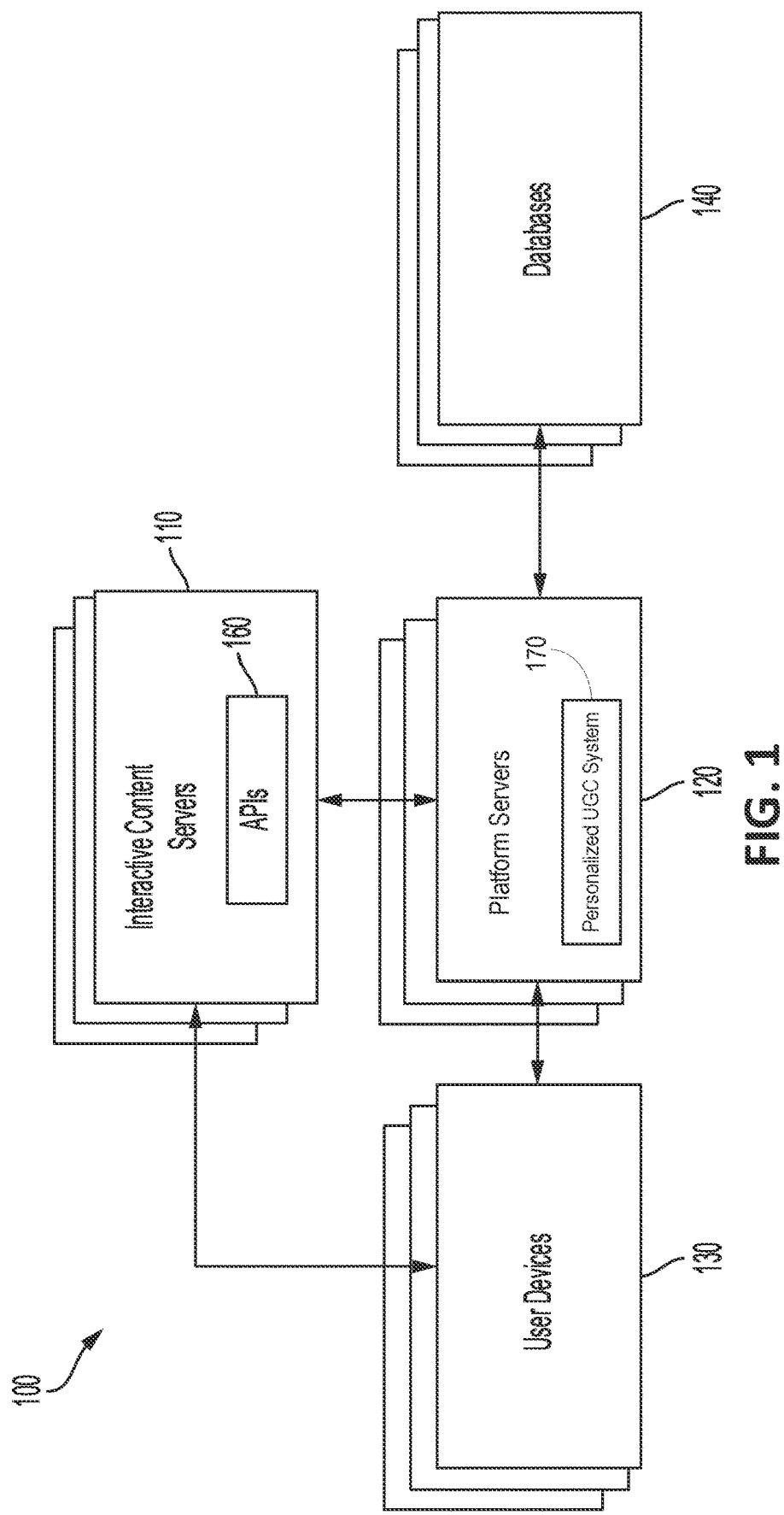
FIG. 1 illustrates a network environment in which a system for personalization of user generated content may be implemented.

FIG. 1 illustrates a network environment in which a system for personalization of user generated content may be implemented. The network environment 100 may include one or more interactive content servers 110 that provide streaming content, such as interactive video, video games, etc., one or more platform servers 120, one or more user devices 130, and one or more databases 140.

Interactive content servers 110 may maintain, stream, and host interactive media available to stream or download on a user device 130 over a communication network. Such interactive content servers 110 may be implemented in the cloud, such as one or more cloud servers. Each media may include one or more sets of object data that may be available for participation with by a user, such as viewing or interacting with an activity of the content. Data about the object shown in the media may be stored by the interactive content servers 110, platform servers 120 and/or the user device 130.

The platform servers 120 may be responsible for communicating with the different interactive content servers 110, databases 140, and user devices 130. Such platform servers 120 may be implemented on one or more cloud servers. The interactive content servers 110 may communicate with multiple platform servers 120, though the interactive content servers 110 may be implemented on one or more platform servers 120. The platform servers 120 may also carry out instructions, for example, receiving a user request from a user to stream streaming media, such as games, activities, video, podcasts, User Generated Content ("UGC"), and publisher content. The platform servers 120 may further carry out instructions, for example, for streaming the streaming media content titles.

The streaming media and the associated at least one set of object data may be provided through an application programming interface (API) 160, which allows various types of interactive content servers 110 to communicate with different platform servers 120 and different user devices 130. API 160 may be specific to the particular computer programming language, operating system, protocols, etc., of the interactive content servers 110 providing the streaming media content titles, the platform servers 120 providing the media and the associated at least one set of object data, and user devices 130 receiving the same. In a network environment 100 that includes multiple different types of interactive content servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. The user devices 130 may include various hardware sensors for detecting user interactions, such as a camera, microphone, haptic feedback input mechanisms, and gyroscopes. Hardware sensors in user devices may be used to capture user response and feedback, such as gestures, speech, and facial expressions. These user devices 130 may also run using a variety of different operating systems, such as iOS or Android. The user devices 130 may also run a variety of applications or computing languages, such as C++ or JavaScript. The user device may include one or more devices associated with a user or a user device capable of displaying on one or more screens.

The databases 140 may be stored on the platform server 120, the interactive content servers 110, on the same server, on different servers, on a single server, across different servers, or on any of the user devices 130. Such databases 140 may store the streaming media and/or an associated set of object data. Such streaming media may depict one or more objects or activities that a user can participate in or interact with. One or more user profiles may also be stored in the databases 140. Each user profile may include information about the user, such as user progress in an activity and/or media content title, user id, or user game characters and may be associated to an entertainment device and media engaged by a user.

A personalized UGC system 170 may be stored on and executed from the databases 140, user devices 130, platform servers 120 or interactive content servers 110. The personalized UGC system 170 may track the user of a personalized UGC system 170 by each user profile and store user preferences for information delivered by the personalized UGC system 170 on databases 140. The personalized UGC system 170 utilizes a digital display such as a television, projector, monitor, smartphone, virtual reality (VR) head-mounted display or handheld device of a user device 130, and may incorporate one or more physical input devices of a user device 130 such as a touchscreen, remote, controller, joystick, or mouse and keyboard.

Figure 2:
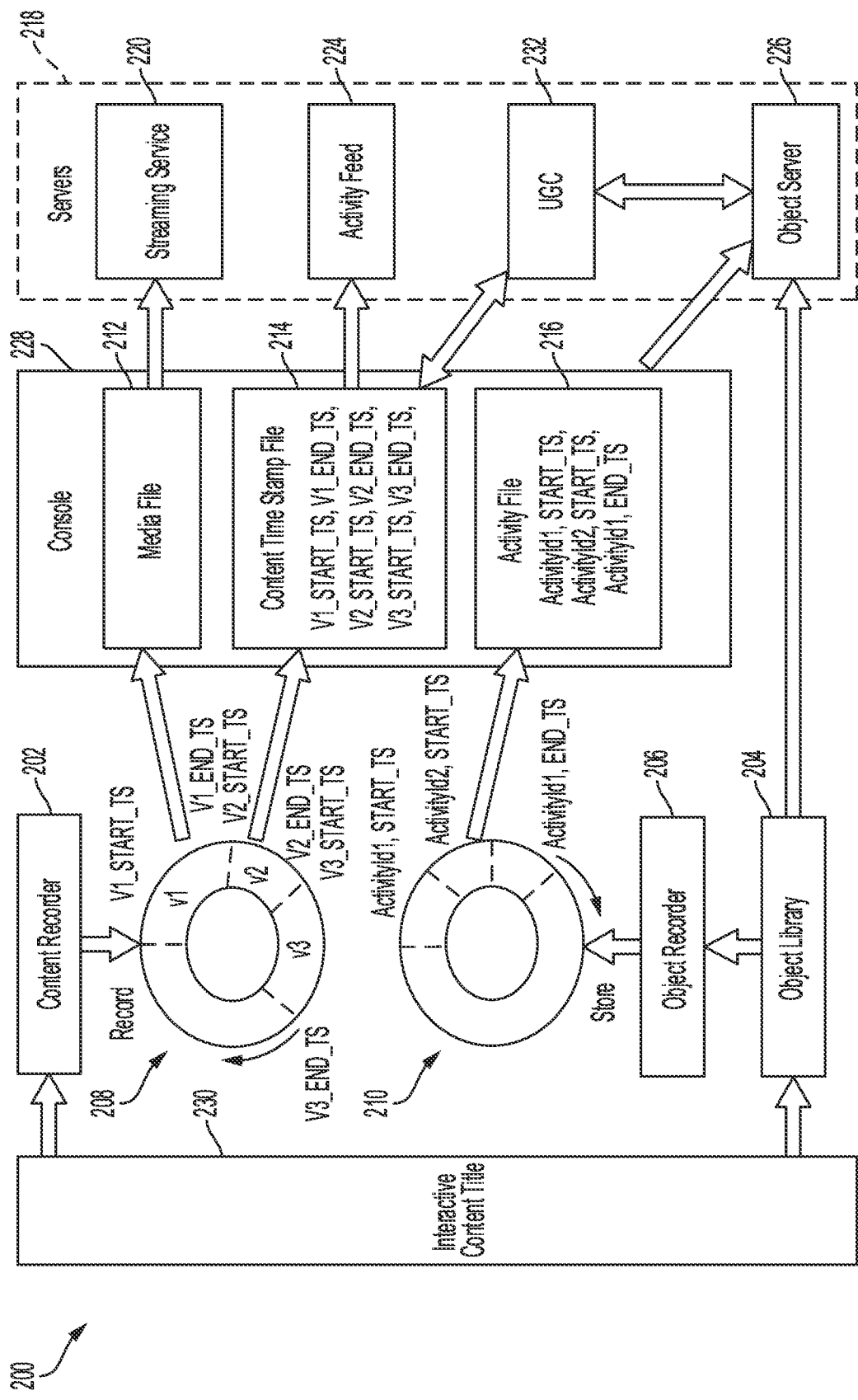
FIG. 2 illustrates an exemplary uniform data system (UDS) that may be used to provide data to a system for personalization of user generated content.

FIG. 2 illustrates an exemplary universal or uniform data system (UDS) that may be used to provide data to a system for a personalized UGC system. Based on data provided by UDS, a personalized UGC system detects the in-game objects, entities, activities, and events that players have engaged with, and thus support analysis of and coordination with in-game activities. Each player interaction may have metadata for the type of in-game interaction, location within the in-game environment, and point in time within an in-game timeline, as well as other players, objects, entities, among other data associated with gameplay. Thus, metadata for any of the variety of player interactions that can occur in during a game session, including entities, settings, outcomes, actions, effects, locations, and character stats. Such data may further be aggregated, applied to data models, and subjected to analytics. Such a UDS data model may be used to assign contextual information to each portion of information in a unified way across games.

As illustrated in FIG. 2, an exemplary console 228 (e.g., a user device 130) and exemplary servers 218 (e.g., streaming server 220, an activity feed server 224, a user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, any of the servers 218, any console 228, or any user device 130. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform server 120, a cloud server, any of the servers 218, any console 228, or any user device 130. When the object recorder 206 detects an object beginning, the object recorder 206 receives object data (e.g., if the object were an activity, player interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., tutorial interaction, menu access, competitive match, quest, task, etc.), player or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

Figure 3:
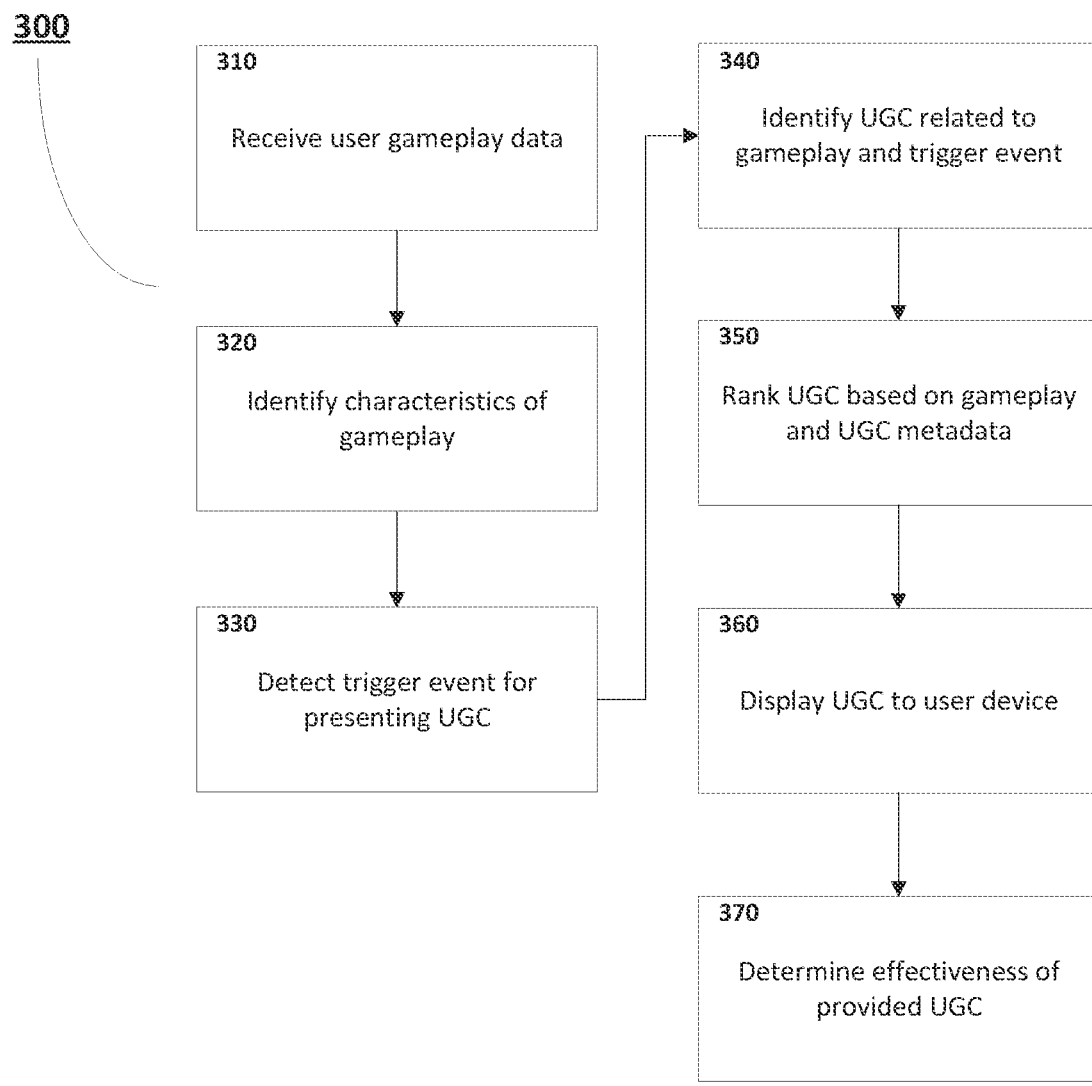
FIG. 3 is a flowchart illustrating an exemplary method for providing personalization of user generated content.

FIG. 3 is a flowchart illustrating an exemplary method for providing personalization of user generated content. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device. The exemplary process illustrated in FIG. 3 may be performed repeatedly during use of a personalized UGC system 170.

In step 310, the personalized UGC system 170 receives player gameplay data from a UDS. Player gameplay data received by the personalized UGC system 170 may include a variety of data corresponding to both historic and current gameplay of a player engaged in one or more interactive content titles, such as a video game. Historic gameplay data may include lifetime information for previous events a player has engaged with, such as metadata indicating progress of the player in one or more video games. Current gameplay data may include a variety of object and activity data of a character controlled by the player, such as movement of the character, camera angle, and accuracy of inputs recorded by the UDS in a most recent previous gameplay session or during an active gameplay session.

In step 320, the personalized UGC system 170 may identify characteristics of gameplay associated with the player based on the play of one or more video games. Historic and current gameplay data of the user profile received in step 310 may be analyzed to identify aspects of gameplay that may categorize the gameplay of the player.

Historic gameplay data, including progression towards completion of a game or activity, modes of the game the player has played, total duration the player has played a game, and similar engagement data may be analyzed by the personalized UGC system 170 to identify patterns of behavior and player preferences in gameplay style. The personalized UGC system 170 may determine a score for category of gameplay preference or style exhibited by the player. The determined score for each gameplay category provided by the personalized UGC system 170 may be weighted on various scales and interpreted in a variety of ways based on each historic gameplay category. For example, a personalized UGC system 170 may receive historic gameplay data for a player that includes 80% completion recorded for the progress of activities in a single player game mode of a game. Historic gameplay data for the same player may indicate the player has only completed 5% of activities for the multiplayer game mode of the same game. The personalized UGC system 170 may provide a score for the players preference for single player modes of the game as 80 points, while the players preference for multiplayer modes of the same game may receive a score of 5 points, showing the player has actively engaged in more single player gameplay.

Analysis of historic gameplay data may also include identifying styles of play and skill level of a player in the video game. Completion progress of the game, object and activity data, skill usage, and other gameplay data recorded by the UDS may be analyzed by the personalized UGC system 170 to identify categories of a preferred style of play and skill level of the player. For example, the personalized UGC system 170 may identify the player as preferring a fast completion of tasks, and having an offensive style of play, preferring high risk and high reward compared to a different player that preferred completeness over faster progression and having a more defensive style of play, preferring lower risk to complete the activities. The personalized UGC system 170 may compare historic gameplay data that indicates a player preference for engaging in certain modes of play and styles of gameplay to current or recent gameplay data in later steps of process 300.

Current gameplay data, including activities failed or completed, in-game skills activated, duration of engagement with an activity or object during a gameplay session, and other similar engagement data may be analyzed by the personalized UGC system 170 to identify recent challenges experienced by the player during gameplay. Recent challenges may be associated with active gameplay categories by the personalized UGC system 170.

The personalized UGC system 170 may compare recent challenges in active gameplay categories with scores for patterns of behavior and player preferences in historic gameplay categories to identify characteristics of gameplay. In particular, the personalized UGC system 170 may identify characteristics of gameplay and gameplay style that the player chooses to engage in but has also experienced recent challenges.

In step 330, the personalized UGC system 170 may detect a trigger event for presenting user generated content to the player. The trigger event for presenting user generated content may include automatic triggers detected by the personalized UGC system 170 and manual triggers activated by a player input related to a video game or entertainment device.

Automated triggers for presenting user generated content to the player may be detected in data recorded by the UDS and in sensor data collected by the entertainment system as analyzed by the personalized UGC system 170. Automated triggers may include a detected behavior of the player in gameplay categories identified in step 320, such as a recent challenge experienced by the player, player frustration, and strings of player actions.

The personalized UGC system 170 may detect an automated trigger event for presenting user generated content to the player upon identifying a recent challenge experienced by the player in a preferred gameplay category, such as the example described in step 320. Recent challenges experienced by the player may also be related to gameplay by the personalized UGC system 170 to detecting player frustration resulting in an automatic trigger event. A player frustration may be detected by the personalized UGC system 170 in data collected by the UDS and sensor data received by the entertainment system, or a combination of UDS and sensor data.

Data collected by the UDS detected as player frustration may include examples such as repeated or prolonged challenges experienced by the player, failure to record progress in one or more activities of a video game over multiple gameplay sessions, or abrupt discontinuation of play in a video game after a series of losses, or in a game that the player has previously recorded substantial gameplay time or progress.

Sensor data detected as player frustration may include data collected from a camera, a microphone, a gyroscope or haptic feedback sensor of a controller, and other sensor data that may monitor a player interacting with an entertainment system. For example, camera data associated with player frustration may include detecting gestures, facial expressions, or body language of the player corresponding to negative emotions. In a different example, microphone data associated with player frustration may include detecting increased vocal volume, use of phrases corresponding to negative emotion, or audible distress, such as a player sighing.

A string of player actions may be detected by the personalized UGC system 170 in data received from a UDS associated with gameplay of the player. The string of player actions may include patterns of gameplay. The string of player actions may include activity and object data, such as the player repeatedly using the same skill in a video game, or selecting a choice in gameplay followed by a related or similar choice, such as repeatedly completing similar quests. The string of player actions may also include unique actions performed in a series by the player during gameplay, such as failing to defeat a particular enemy and subsequently changing equipment of a character.

The personalized UGC system 170 may detect a string of player actions, a player frustration or a recent challenge experienced by the player simultaneously. Upon detecting simultaneous events that may be associated with an automated trigger to present UGC, the personalized UGC system may increase the likelihood of executing the trigger.

The personalized UGC system 170 may also detect manual trigger events activated by a player input related to a video game or entertainment device via a console 228 or a user device 130. Manual trigger events for presenting UGC to the player may include the player accessing a game help file, invoking a game help acting card that appears during detection of player frustration or detection of challenges faced by a player, or executing a search query via an entertainment system menu. The game help file may be accessed by the player for a variety of reasons including seeking information that may help the player progress in the game, increase the skill of the player in a gameplay mechanic, or provide the player with gameplay information that may have been missed or ignored.

The personalized UGC system 170 may display a game help acting card upon detection of a player frustration or detection of a recent challenge faced by the player. The game help acting card may appear as an overlay during gameplay in a location on-screen that allows gameplay to remain unobscured. For example, the personalized UGC system 170 may detect a player has failed to defeat an enemy a number of times, and upon failure, may display an overlay in the upper right corner of the gameplay screen. The overlay may include instructions to invoke the game help acting card, such as "Press start to see what other players are doing against this boss."

Alternatively, or in addition to accessing the game help file, the player may enter a search query from a console 228 or a user device 130 to an entertainment system menu related to information about a video game the player has engaged with. The personalized UGC system 170 may identify words or phrases associated with the game, a gameplay category, skill, or other information about the game, such as additional content for the game. The personalized UGC system 170 may detect any combination of player searches or the player accessing the game help file as a manual trigger event to present UGC to the player.

The personalized UGC system 170 may initiate additional steps in process 300 upon detecting an automated trigger, a manual trigger, or any combination therein.

In step 340, upon detecting a trigger event in step 330, the personalized UGC system 170 may identify user generated content relevant to the player gameplay style and the video game. User generated content relevant to the player gameplay style, the video game engaged by the player, and based on a type of trigger event may be identified by analyzing metadata of the player gameplay and the user generated content and detecting metadata that matches or is similar in both.

Metadata of the player gameplay may include information received from the UDS based on player interaction with the media during recorded gameplay, such as the player character interacting with objects, other characters, or events. The UDS may transmit metadata for the detected interaction to the personalized UGC system 170. For example, the UDS may transmit metadata for an event partaken by the player character during gameplay. Such metadata may include a quest title, character statistics, a quest reward, a level of the video game in which the quest is available, and other similar metadata. The personalized UGC system 170 may also receive metadata for identified characteristics of gameplay style for the player, as described in step 320, such as metadata for preferred gameplay categories.

Metadata of the user generated content may include metadata of a prerecorded video or livestream such as a content title, subject of the content, and descriptions or tags including phrases associated with a section of gameplay or gameplay style. In some embodiments, metadata of the user generated content may include gameplay data recorded from a UDS. Metadata of the user generated content recorded from a UDS may be available in the case that the UGC video or livestream was recorded with an entertainment device capable of capturing UDS metadata during gameplay, and subsequently created as a user generated content from the entertainment device, such as a prerecorded video or live stream uploaded directly from a video game console.

The personalized UGC system 170 may determine a number of metadata categories that are matching based on metadata included in the gameplay of the player and metadata of user generated content. Categories for metadata may include detected skill level of the player, preferred gameplay style of the player, and metadata about the game. The personalized UGC system 170 may utilize matching metadata to identify the user generated content that is related to the gameplay preferences of the player, gameplay style of the player, and a trigger event to execute additional steps in the process 300.

In an alternative embodiment, the personalized UGC system 170 may receive a gameplay recording of the player gameplay from the UDS and may analyze the recording to identify features of a vector-space in a game environment.

Features of a vector-space in the game environment may include examples such as rooms, objects, characters, and other three-dimensional rendered elements of a game. Features of a vector-space in the game environment may be identified by the personalized UGC system by processing image frames of the recording and mapping position vectors (i.e. an X,Y,Z three-dimensional coordinate corresponding to a position in the video game environment), and further tracking movement and changes in the position vectors in one or more subsequent image frames. A position vector may be associated to a feature of the game environment by comparing three-dimensional coordinate positions relative to different position vectors in one or more image frames. Features of the game environment may be analyzed by the personalized UGC system 170 to identify an exact location or event in a game experienced by the player. The personalized UGC system 170 may store features identified in the game environment and the location or event experienced by the player, and players progression in a game as metadata of the player gameplay.

The personalized UGC system 170 may further perform feature identification of a vector-space game environment in user generated content by processing image frames of the user generated content to identify prerecorded videos or livestreams that match or are similar to the location or event experienced by the player during gameplay. The personalized UGC system 170 may store features identified in the user generated content and the location or event experienced in the video or livestreams as metadata associated with the user generated content. User generated content and recorded gameplay of the player that possess matching or similar vector metadata associated with the game environment may be identified by the personalized UGC system 170 as relevant UGC to present to the player.

Further, the personalized UGC system 170 may identify a uniqueness factor associated with the user generated content. The uniqueness factor may include an exemplary metadata category of interest to the player, determined by player skill and gameplay styles exhibited by the player as tracked by the personalized UGC system 170. For example, the personalized UGC system 170 may determine a player gameplay style as offensive, preferring to complete objectives as quickly as possible. The personalized UGC system 170 may further identify user generated content containing gameplay focused on completing objectives quickly and may mark the uniqueness factor as an offensive style.

In step 350, the personalized UGC system 170 may rank identified user generated content to be presented to the player. Ranking user generated content may include determining a number of matching metadata categories and scoring various factors identified in matching metadata of the identified user generated content and the gameplay of a player.

Relevancy factors of user generated content may include scoring the relevancy or similarity of a factor in user generated content to the same factor identified in player gameplay. The relevancy of a factor may further be weighted based on recency. For example, the game title metadata may have a greater weight than a game type metadata. In a different example, metadata for user generated content that includes a skill being used in a game mode the player prefers may have a greater weight than the same skill being used in a game mode the player does not prefer. In another example, a gameplay style and preference exhibited by the player more recently may have a greater weight than a game style and preference exhibited by the player based on overall player data or historic gameplay data.

Further, the personalized UGC system 170 may score relevancy of user generated content containing more metadata categories in common with the metadata of the player gameplay as a higher score than user generated content containing less metadata categories in common with the recorded player gameplay. Such relevancy scoring may also be applied to vector-space analysis of image frames processed and identified in step 340. User generated content with the highest combined relevancy scores may rank highest in priority to be presented to the player upon detection of a trigger event.

In some cases, the rank of the user generated content may be adjusted based on priority of a video game publisher. The personalized UGC system 170 may incorporate rules set by the video game publisher in combination with scored rankings to prioritize certain objectives defined by the video game publisher. Objectives of the video game publisher incorporated as rules may include making players aware of additional content for a video game (e.g. downloadable content, or "DLC") or related but separate games developed and/or distributed by the publisher.

For example, a video game publisher may set a rule when publishing a new additional content for a video game to a digital distribution platform, such as "prioritize DLC in personalized user generated content." The personalized UGC system 170 may incorporate the rule to prioritize the additional content in appropriate cases when presenting a player with relevant UGC, such as ranking a trailer video for additional content as a top ranked user generated content for players that have tracked UDS data indicating completing or nearing completion of a base video game. Additional content being released for the base video game in which a player has made significant progress may be both relevant to the player and may increase awareness of the publisher content.

In step 360, the personalized UGC system 170 may display ranked user generated content on a user device 130. The display of ranked user generated content may be presented to the player during a trigger event detected in step 330 and may be displayed on an overlay of the video game or entertainment system. The display may provide a specific point on the UGC to initiate playback based on detected relevance and to avoid spoilers. In some embodiments, the ranked user generated content may be presented during suspended play of a game, such as during a trigger event where the player has paused the game and accessed a game help file. In other embodiments, the display may be presented to the player in a home screen, or a game hub in the listing of games upon initiating engagement with the entertainment system.

Figure 4:
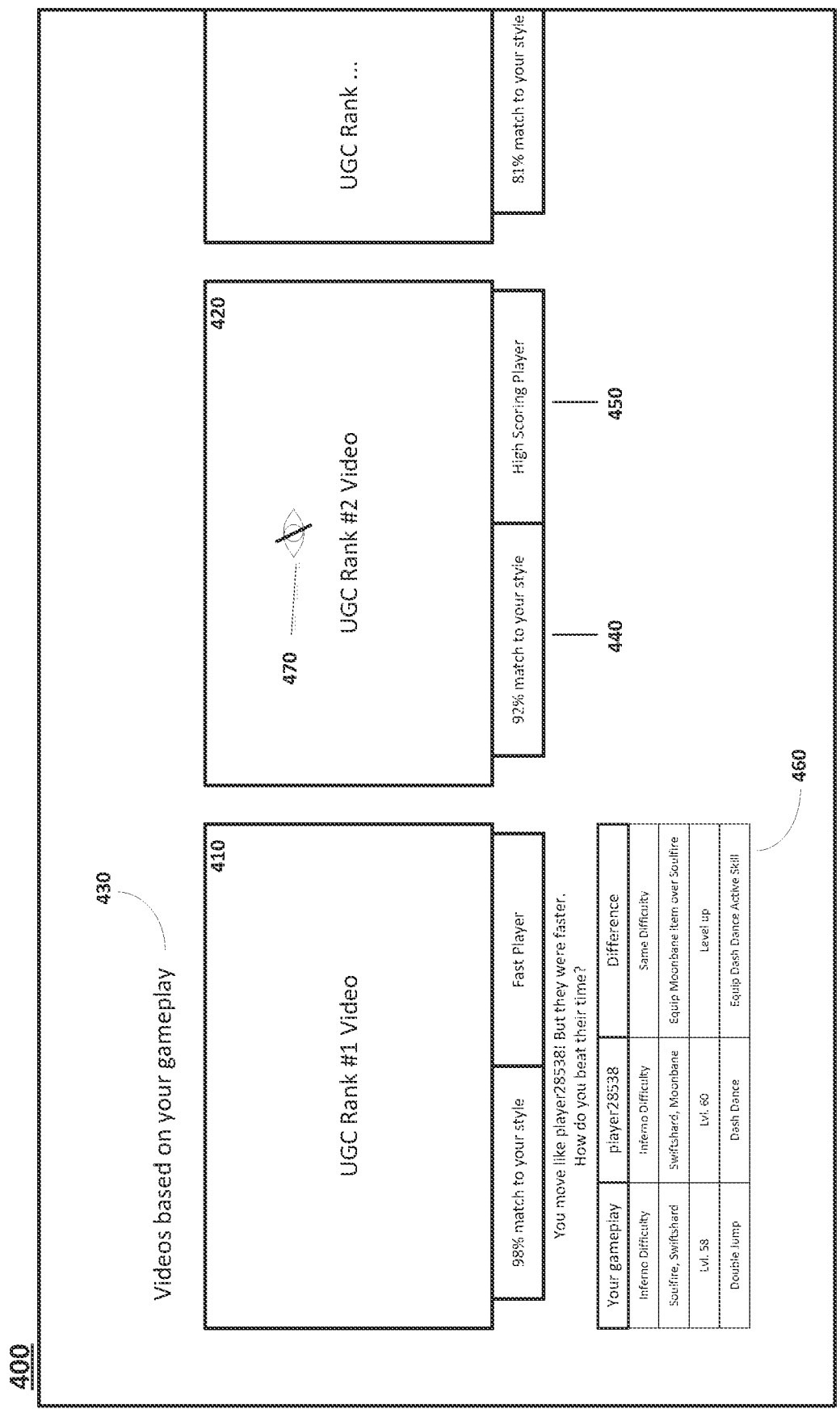
FIG. 4 illustrates an exemplary display of user generated content ranked by a system for personalization of user generated content.
Figure 5:
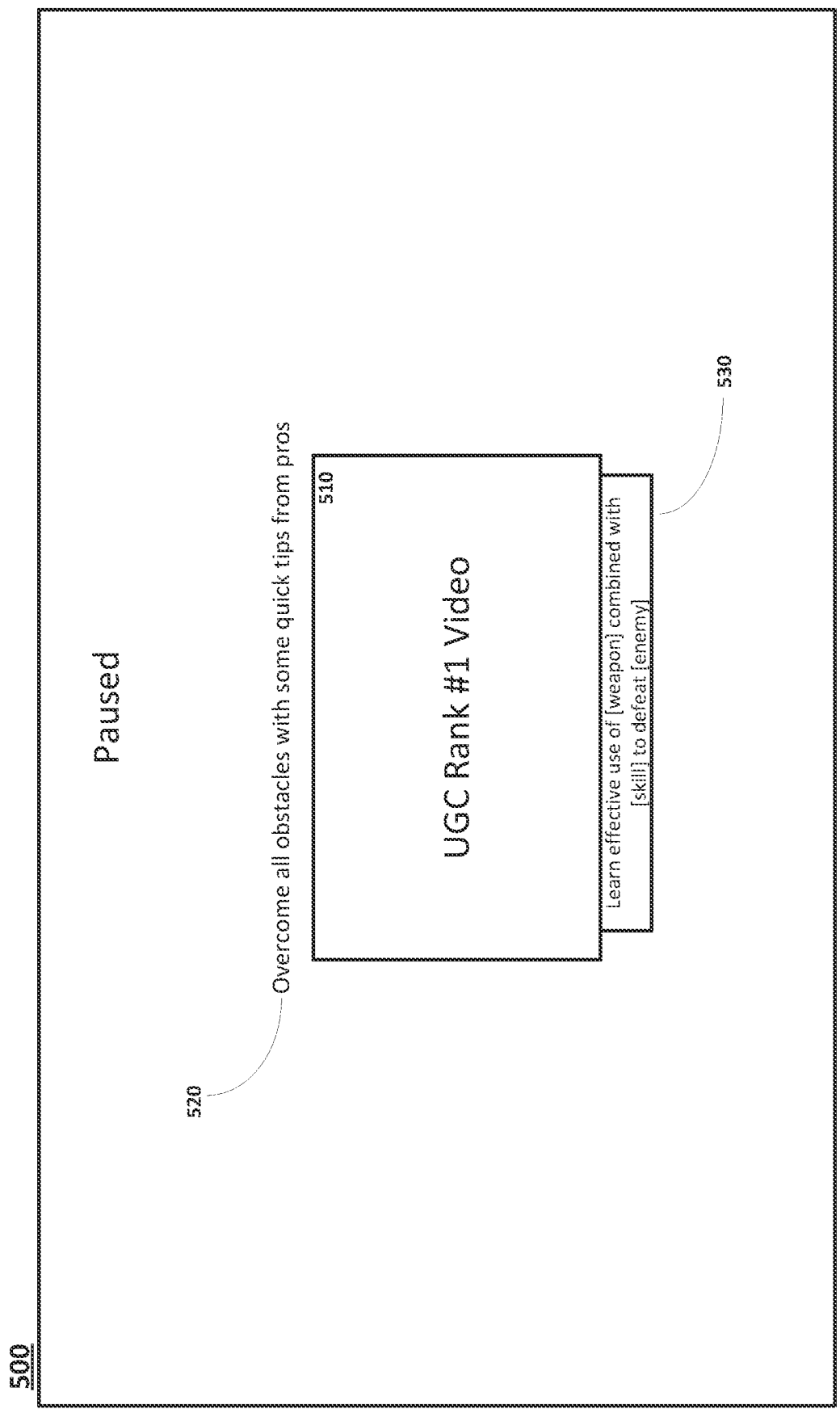
FIG. 5 illustrates an exemplary display of personalized user generated content provided by the system as an interstitial overlay concurrent to gameplay.
Figure 6:
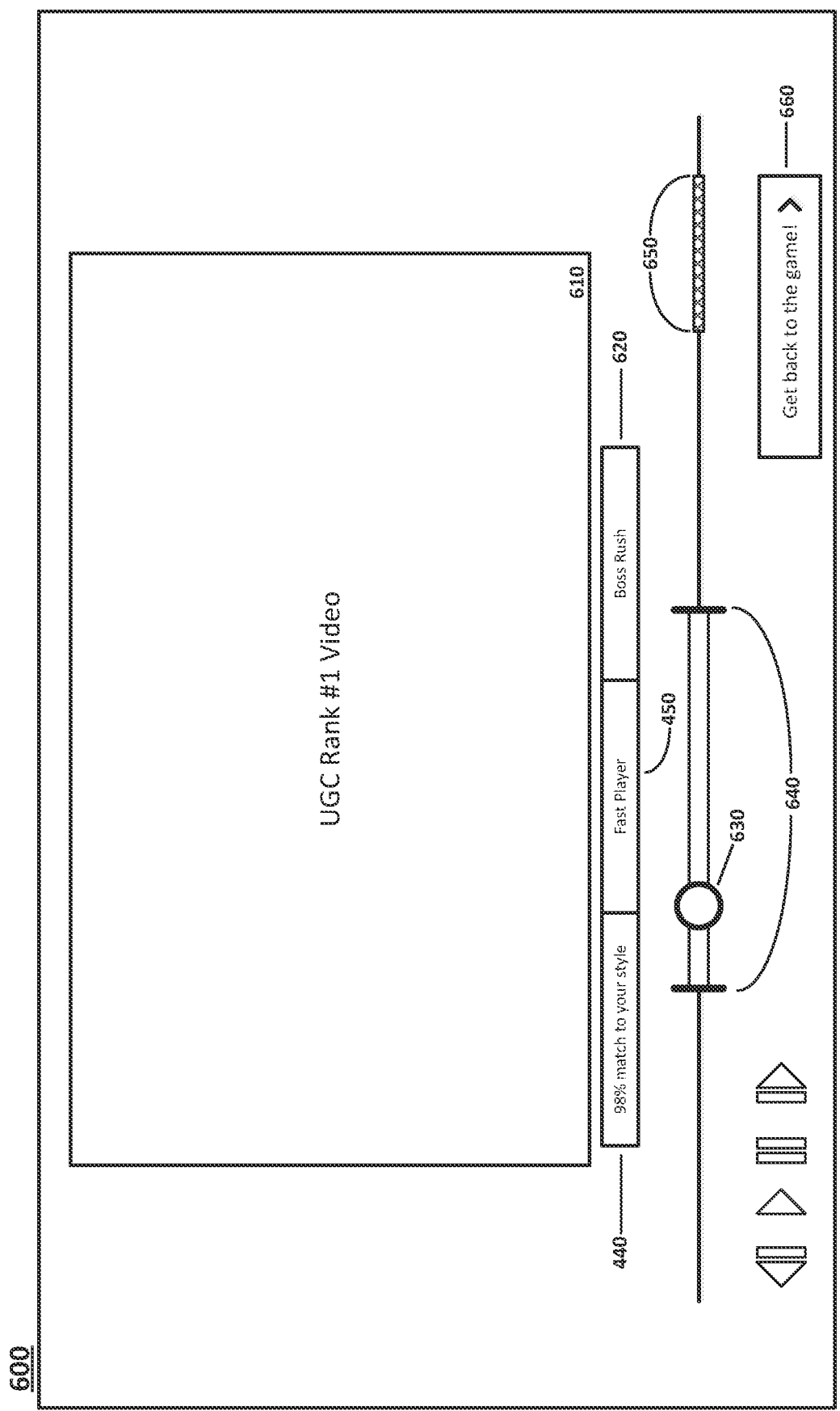
FIG. 6 illustrates an exemplary display for playback of user generated content provided by a system for personalization of user generated content.

FIG. 4-6 include description detailing methods in which the personalized UGC system 170 may display ranked user generated content and may further assess and display effectiveness of presented content to the player.

In step 370, the personalized UGC system 170 may determine a post-game summary of effectiveness for the provided user generated content. A post-game summary may be determined after a gameplay session for a game when the player has also engaged with user generated content related to the game. The personalized UGC system 170 may analyze UDS data received during the gameplay session and may compare metadata of the session to previous gameplay sessions of the player. The comparison may be tracked by the personalized UGC 170 system and may be used to refine ranking of user generated content for the player based on the outcome of the player gameplay session. In the case that the outcome of tracked gameplay includes the player performing feats in the game session related to previously presented user generated content more effectively, with more variation, or other outcomes related to strategies, skills, and information provided by the user generated content, subsequent provided user generated content may be presented based on the same weighted combination. If the gameplay session instead indicates the player performed the same as previous gameplay sessions or failed to improve in activities related to the previously presented user generated content, the ranking may be refined based on different weighted combinations than the previous ranking.

FIG. 4 illustrates an exemplary display of user generated content ranked by a system for personalization of user generated content. A display of ranked user generated content 400 may be presented to a player by a personalized UGC system 170 when a trigger event asynchronous to gameplay is detected, such as a player executing a search query from an entertainment system menu. The trigger event asynchronous to gameplay may provide the results of the process described in steps 310-350 of FIG. 3 in a variety of formats that may be displayed on a user device 130.

The display 400 may sort displayed results by rank, where a highest ranked user generated content 410 appears first, a second highest ranked user generated content 420 appears second, etc. The display 400 may include a personalized message 430 indicating to the player that the displayed UGC results have been curated based on a recorded gameplay record during previous gameplay for a video game. Each displayed UGC result may include a relevancy score 440 and a uniqueness factor 450. The relevancy score 440 may indicate how similar the UGC result is to gameplay of the player by displaying combined metadata and vector-based game environment mapping scores as a percentage match. The uniqueness factor 450 may include player skill and gameplay styles associated with the player gameplay history that are also exemplified by the content of the ranked UGC result. The ranking of the user generated content may be based on a weighted combination of the relevancy score 440 and uniqueness factor 450.

In some embodiments, the display of ranked user generated content 400 may include a comparison of gameplay 460 comparing UDS data recorded for the player with the user generated content. The comparison of gameplay 460 may include specific factors of gameplay metadata detected in analysis of UDS data by the personalized UGC system 170 related to both the player gameplay and the ranked UGC result, such as a level of difficulty selected, completion time for the activity, skills used during completion of the activity, and character experience level at the time of completion.

The display 400 may also display a spoiler label 470 overlaying a UGC result. The spoiler label 470 may be displayed to indicate that the UGC result contains content of a video game not yet interacted with by the player. The spoiler label 470 may display when a spoiler is present in any portion of a UGC result. In some embodiments, the portion of the UGC result that contains spoiler content may be in a different portion of the video than the suggested portion intended for the player. In such cases, the spoiler label 470 may be indicate the UGC result can be viewed without viewing the spoiler, such as coloring the spoiler label 470 yellow. In some embodiments, the portion of the UGC result that contains content relevant to the player may also include a spoiler. In such cases, the spoiler label 470 may indicate that the portion containing a spoiler cannot be avoided if the player watches the video by changing the color of the overlay, such as changing the color to red.

FIG. 5 illustrates an exemplary display of personalized user generated content provided by the system as an interstitial overlay concurrent to gameplay. Such a display may be displayed during suspension of gameplay initiated by the player (e.g., the player pausing a game to access a help menu) or initiated by an automated trigger event detected by the personalized UGC system 170. The interstitial overlay 500 may display one or more ranked UGC results 510, a title for a UGC result 520, and subtext 530. Subtext 530 may explain to the player briefly why the UGC result was selected and prioritized for the interstation overlay 500.

FIG. 6 illustrates an exemplary display for playback of user generated content provided by the system for personalization of user generated content. A player may select to view a ranked UGC result from a display of UGC results, such as displays depicted in FIGS. 5 and 6. Upon receiving player selection to view the ranked UGC result, the personalized UGC system 170 may initiate playback of the selected user generated content and may display a media player 600 including a variety of information for the selected user generated content.

The media player 600 may display a prerecorded video or livestream playback viewport 610 where streaming video of user generated content may be played. The playback viewport 610 may also include a display of metadata and an identified relation of the selected user generated content to the gameplay of the player, such as a localized activity name 620 included in the gameplay of the user generated content, a title of the game, and a relevancy score 440 and a uniqueness factor 450, as described in FIG. 4.

In some embodiments, the media player 600 may automatically begin playback of user generated content after the content has been selected by the user. The media player 600 may automatically begin playing at the timestamp for the portion of the video suggested to the user.

The media player 600 may also display controls for navigating playback of the selected user generated content and identifying sections of content. Controls for navigating playback and identifying sections of content of the selected user generated content may include a scrubber 630, one or more highlighted content sections 640, and one or more spoiler warning sections 650.

The scrubber 630 indicates a current position of play on the playback viewport 610 that may be used by the player to navigate playback of the selected user generated content by providing various inputs to a user device 130. Input to the scrubber 630 may move playback forward, backward, or jump to specific timestamps of the selected user generated content.

The highlighted content sections 640 may include designated subsections of the selected user generated content identified by the personalized UGC system 170 as relevant to the player gameplay style, skill level, or areas of improvement for player gameplay to overcome a recent challenge. The highlighted content sections 640 may include various subsections of the selected user generated content or may include the entire duration of the selected user generated content.

The spoiler warning sections 650 may include designated subsections of the selected user generated content identified by the personalized UGC system 170 as containing gameplay content not yet engaged by the player. The spoiler warning sections 650 may be identified by the personalized UGC system 170 during analysis of UDS data for gameplay of the player. For example, the personalized UGC system 170 may identify the history of activity data of a game engaged by the player and may detect one or more sections of content in the selected user generated content that contains metadata from gameplay content sections not yet engaged by the player. The personalized UGC system 170 may flag the duration of the section related to content not yet engaged by the player as a spoiler warning section 650. Spoiler warning sections 650 may be automatically skipped during playback of the selected user generated content. In the case that the player navigates playback of the selected user generated content and moves the scrubber 630 to jump to a section of the content flagged as a spoiler warning section 650, the UGC system 170 may request confirmation from the player to play spoiler content via a confirmation dialogue displayed on the user device 130.

In addition to navigation controls, the media player 600 may include a game call to action (CTA) 660. The game CTA 660 may be selected via a player input to user device 130 during or after playback of the selected user generated content. Selection of the game CTA 660 may suspend or exit the media player 600 and launch the related game application. In some embodiments, the user may not select the CTA 660 during playback or after the conclusion of the user generated content, and the user generated content may finish playing. The media player 600 may automatically continue to play the next user generated content based on rank and may repeat the process until the user exits the content via the CTA 660 or otherwise.

Figure 7:
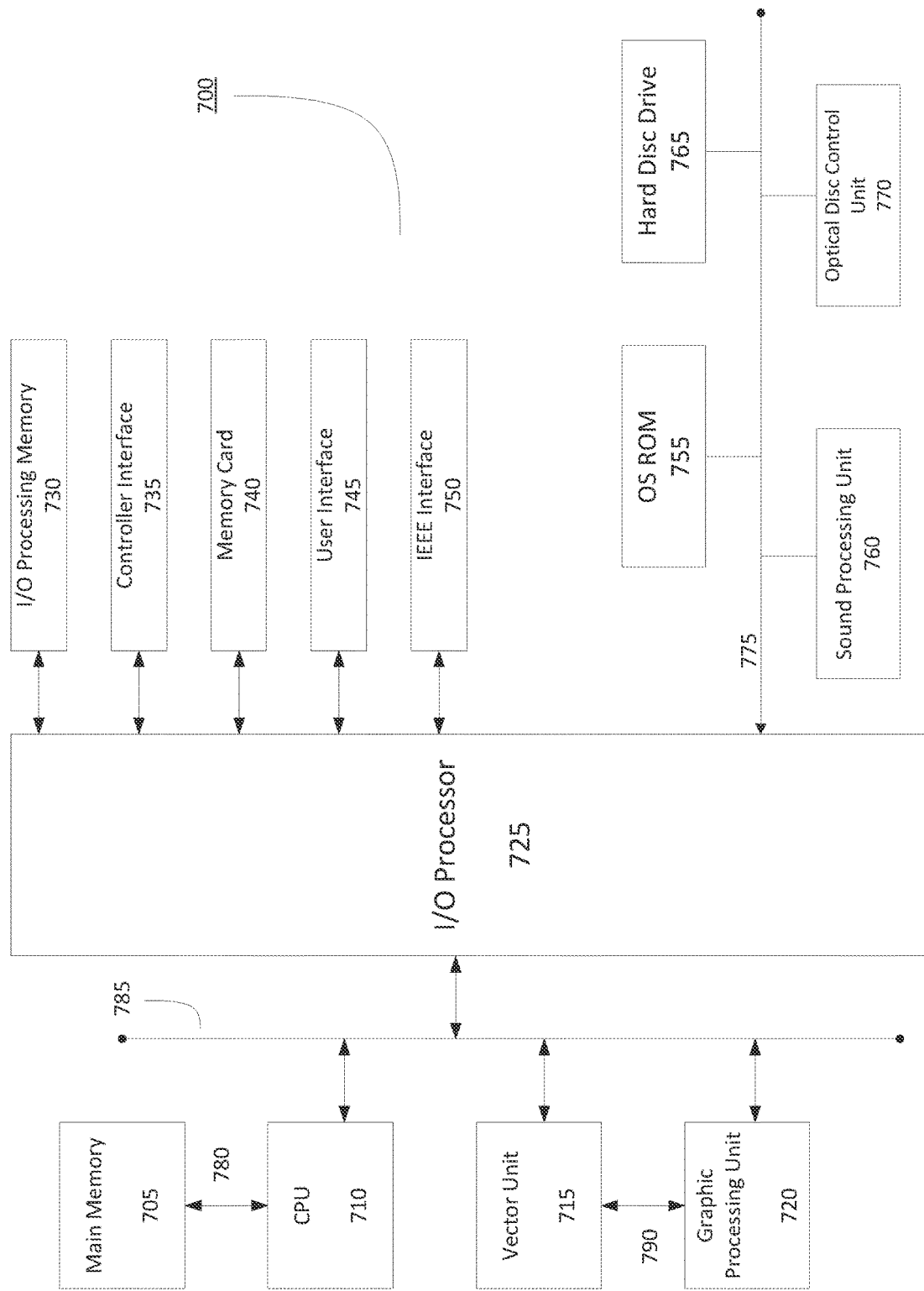
FIG. 7 is a block diagram of an exemplary electronic entertainment system.

FIG. 7 is a block diagram of an exemplary electronic entertainment system 700. The entertainment system 700 of FIG. 7 includes a main memory 705, a central processing unit (CPU) 710, vector unit 715, a graphics processing unit 720, an input/output (I/O) processor 725, an I/O processor memory 730, a controller interface 735, a memory card 740, a Universal Serial Bus (USB) interface 745, and an IEEE interface 750. The entertainment system 700 further includes an operating system read-only memory (OS ROM) 755, a sound processing unit 760, an optical disc control unit 770, and a hard disc drive 765, which are connected via a bus 775 to the I/O processor 725.

Entertainment system 700 may be an electronic game console. Alternatively, the entertainment system 700 may be implemented as a general-purpose computer, a set-top box, a hand-held game device, a tablet computing device, or a mobile computing device or phone. Entertainment systems may contain more or less operating components depending on a particular form factor, purpose, or design.

The CPU 710, the vector unit 715, the graphics processing unit 720, and the I/O processor 725 of FIG. 7 communicate via a system bus 785. Further, the CPU 710 of FIG. 7 communicates with the main memory 705 via a dedicated bus 780, while the vector unit 715 and the graphics processing unit 720 may communicate through a dedicated bus 790. The CPU 710 of FIG. 7 executes programs stored in the OS ROM 755 and the main memory 705. The main memory 705 of FIG. 7 may contain pre-stored programs and programs transferred through the I/O Processor 725 from a CD-ROM, DVD-ROM, or other optical disc (not shown) using the optical disc control unit 770. I/O Processor 725 of FIG. 7 may also allow for the introduction of content transferred over a wireless or other communications network (e.g., 4G, LTE, 3G, and so forth). The I/O processor 725 of FIG. 7 primarily controls data exchanges between the various devices of the entertainment system 700 including the CPU 710, the vector unit 715, the graphics processing unit 720, and the controller interface 735.

The graphics processing unit 720 of FIG. 7 executes graphics instructions received from the CPU 710 and the vector unit 715 to produce images for display on a display device (not shown). For example, the vector unit 715 of FIG. 7 may transform objects from three-dimensional coordinates to two-dimensional coordinates, and send the two-dimensional coordinates to the graphics processing unit 720. Furthermore, the sound processing unit 760 executes instructions to produce sound signals that are outputted to an audio device such as speakers (not shown). Other devices may be connected to the entertainment system 700 via the USB interface 745, and the IEEE interface 750 such as wireless transceivers, which may also be embedded in the system 700 or as a part of some other component such as a processor.

A user of the entertainment system 700 of FIG. 7 provides instructions via the controller interface 735 to the CPU 710. For example, the user may instruct the CPU 710 to store certain game information on the memory card 740 or other non-transitory computer-readable storage media or instruct a character in a game to perform some specified action.

The system may be implemented in an application that may be operable by a variety of end user devices. For example, an end user device may be a personal computer, a home entertainment system (e.g., Sony PlayStation2® or Sony PlayStation3® or Sony PlayStation4®, or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The system may also be implemented with cross-title neutrality wherein an embodiment of the present system may be utilized across a variety of titles from various publishers.

The present system may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing personalized assistance in virtual environment, the method comprising:
storing a plurality of trigger events in memory, each trigger event based on user interaction in the virtual environment;
receiving data sent over a communication network regarding gameplay of a user associated with a media title engaged in the virtual environment;
detecting user engagement with one or more interactive objects of the media title based on the received data;
identifying play characteristics exhibited by the user based on the detected user engagement with the one or more interactive objects of the media title;
identifying one or more user generated content streams that meet conditions of an identified one of the trigger events;
ranking the identified streams based on a match between the play characteristics exhibited by the user and metadata of each of the identified streams; and
providing a display of one or more of the ranked streams, wherein the display includes an analysis of the match.

2. The method of claim 1, wherein identifying the play characteristics exhibited by the user includes identifying a skill level of the user.

3. The method of claim 1, wherein identifying the play characteristics exhibited by the user includes identifying play style preference of the user.

4. The method of claim 1, wherein the plurality of trigger events includes a receipt of a user search string for a user generated content stream.

5. The method of claim 1, wherein the plurality of trigger events includes a string of user engagement actions associated with the media title.

6. The method of claim 1, wherein the conditions of the identified one of the trigger events include metadata of the gameplay of the user matching the metadata of each of the identified streams.

7. The method of claim 6, wherein the metadata of the gameplay of the user is based on features identified during the gameplay mapped in a vector-space.

8. The method of claim 1, wherein the metadata of the each of the identified streams is based on features identified features in the streams mapped in a vector-space.

9. The method of claim 1, wherein the ranking is based on a weighted combination of relevancy factors.

10. The method of claim 1, wherein the ranking is further adjusted based on predetermined priority factors.

11. The method of claim 1, wherein the display is provided as an interstitial display.

12. The method of claim 1, wherein the display includes markers to indicate relevant portions of the identified streams.

13. The method of claim 1, wherein the display includes a warning for spoilers in the identified streams, wherein the spoilers include content in the media title not accessed by the user.

14. The method of claim 1, further comprising analyzing post-assistance user action based on the provided display, wherein the play characteristics exhibited by the user based on the received data is compared to characteristics of the post-assistance user action.

15. The method of claim 14, wherein the comparison between the play characteristics exhibited by the user and the characteristics of the post-assistance user action adjusts ranking of the one or more streams.

16. A system for providing personalized assistance in virtual environment, the system comprising:
memory that stores a plurality of trigger events, each trigger event based on user interaction in the virtual environment;
a communication interface that receives data sent over a communication network regarding gameplay of a user associated with a media title engaged in the virtual environment; and
a processor that executes instructions stored in memory, wherein the processor executes the instructions to:

detect user engagement with one or more interactive objects of the media title based on the received data;

identify play characteristics exhibited by the user based on the detected user engagement with the one or more interactive objects of the media title;

identify one or more user generated content streams that meet conditions of an identified one of the trigger events;

rank the identified streams based on a match between the play characteristics exhibited by the user and metadata of each of the identified streams; and provide a display of one or more the ranked streams, wherein the display includes an analysis of the match.

17. A non-transitory computer-readable storage medium, having embodied thereon a program executable by a processor to perform a method for providing personalized assistance in virtual environment, the method comprising:

storing a plurality of trigger events in memory, each trigger event based on user interaction in the virtual environment;

receiving data sent over a communication network regarding gameplay of a user associated with a media title engaged in the virtual environment;

detecting user engagement with one or more interactive objects of the media title based on the received data;

identifying play characteristics exhibited by the user based on the detected user engagement with the one or more interactive objects of the media title;

identifying one or more user generated content streams that meet conditions of an identified one of the trigger events;

ranking the identified streams based on a match between the play characteristics exhibited by the user and metadata of each of the identified streams; and providing a display of one or more the ranked streams, wherein the display includes an analysis of the match.

* * * * *